J. Miller.
Harvester Dropper.

N° 84368. Patented Nov. 24, 1868.

Witnesses
Edwin J. McLain
Jno. D. Patten

Inventor
Jacob Miller
By atty A B Stoughton

JACOB MILLER, OF CANTON, OHIO.

Letters Patent No. 84,368, dated November 24, 1868.

IMPROVEMENT IN DROPPING-PLATFORMS FOR HARVESTERS.

The Schedule referred to in these Letters Patent and making part of the same.

*To all whom it may concern:*

Be it known that I, JACOB MILLER, of Canton, in the county of Stark, and State of Ohio, have invented certain new and useful Improvements in Droppers for Harvesting-Machines; and I do hereby declare the following to be a full, clear, and exact description of the same, reference being had to the accompanying drawings, making a part of this specification, in which—

Similar letters of reference, where they occur in the separate figures, denote like parts of the dropper in all the drawings.

My invention consists in the combination of a centrally, or nearly so, pivoted platform, a travelling belt, and a flexible apron, united together, so that, by means of a lever or its equivalent, the platform may be dumped, to drop the grain upon it, and the apron, at the same time, be raised up, to catch the falling grain, and the reverse operation remove the apron, and bring the platform into position to receive the falling grain.

To enable others skilled in the art to make and use my invention, I will proceed to describe the same with reference to the drawings.

A represents an outer, and B, the inner board or divider of a grain-harvester, and C, the finger-bar united to them.

D is a platform or grain-table, pivoted to the dividing-boards A B at about the points $a\ a$ therein, said platform, when in receiving position, being close to and in rear of the finger-bar.

To the front edge of the platform is secured one end of a flexible apron, $b$, which is as long as the platform. The other end of the apron passes underneath the platform, and is secured to a straining-bar, $c$, and the edges of the apron are fastened to belts $d\ d$, that are secured to the front of the platform, and thence, passing over rollers $e\ e'$, are secured to arms $f\ f$, fastened to the upper side of the platform.

E is a lever, secured to the platform, and rising up, so as to be within the reach of the operator, or connected to or with other devices, so as to be operated by the driver in his seat.

Figure 1:
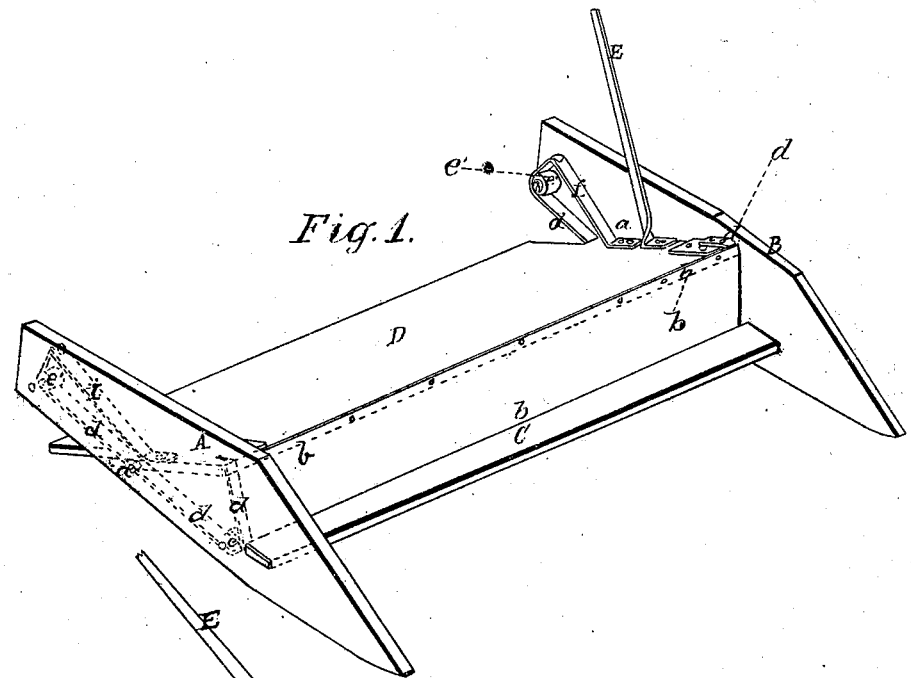
Figure 1 represents, in perspective, so much of a harvesting-machine as will illustrate the construction and operation of the dropper.
Figure 2:
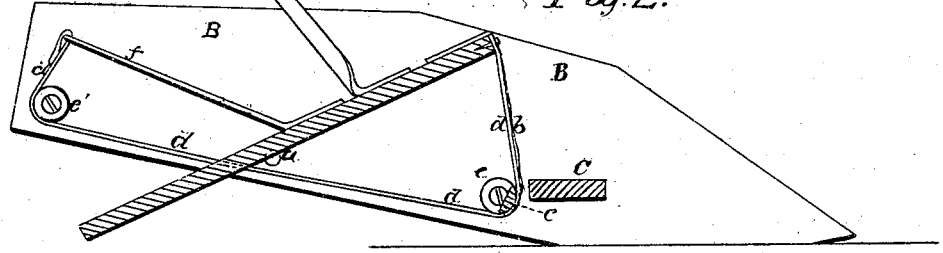
Figure 2 represents a section through the platform or grain-table, in a position for dropping the gathered gavel on the ground.
Figure 3:
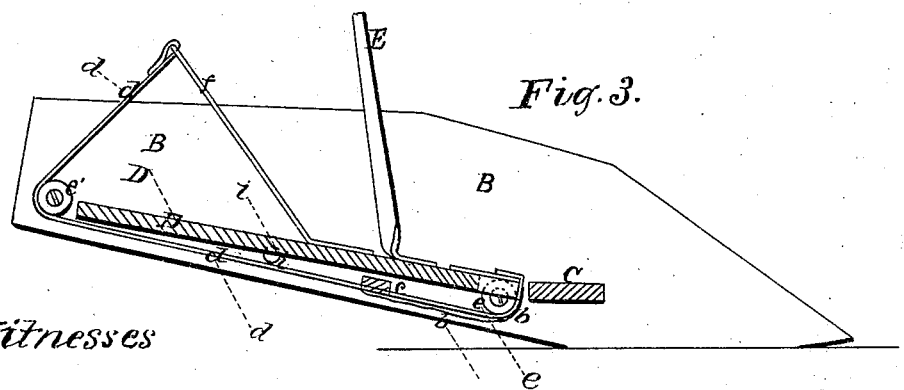
Figure 3 represents a similar section, showing the position of the grain-table when gathering the cut grain.

When the lever E is thrown back, as in figs. 1 and 2, the grain-table is dumped, to deliver the grain, and the apron $b$ is elevated, to catch and hold the falling grain. When the lever is brought back, as in fig. 3, the grain-table is in position to receive the grain held by the apron, which has then passed under the platform, and to catch the falling grain, until another charge has accumulated, and so on.

Having thus fully described my invention,

What I claim therein as new, and desire to secure by Letters Patent, is—

The combination of the pivoted platform, the flexible apron, and the travelling belts, united to each other, as herein described, so that the tipping of the platform shall bring the holding-apron into action, and the returning of the platform into its receiving position move the apron out of action, substantially as herein described.

JAC. MILLER.

Witnesses:
A. B. STOUGHTON,
EDMUND MASSON.